Nov. 10, 1936.        A. W. FRANZMEIER        2,060,392
MILK STRAINER
Filed June 6, 1931        4 Sheets-Sheet 1

Inventor
Alvin W. Franzmeier
By
Attorney

Nov. 10, 1936. A. W. FRANZMEIER 2,060,392
MILK STRAINER
Filed June 6, 1931 4 Sheets-Sheet 2
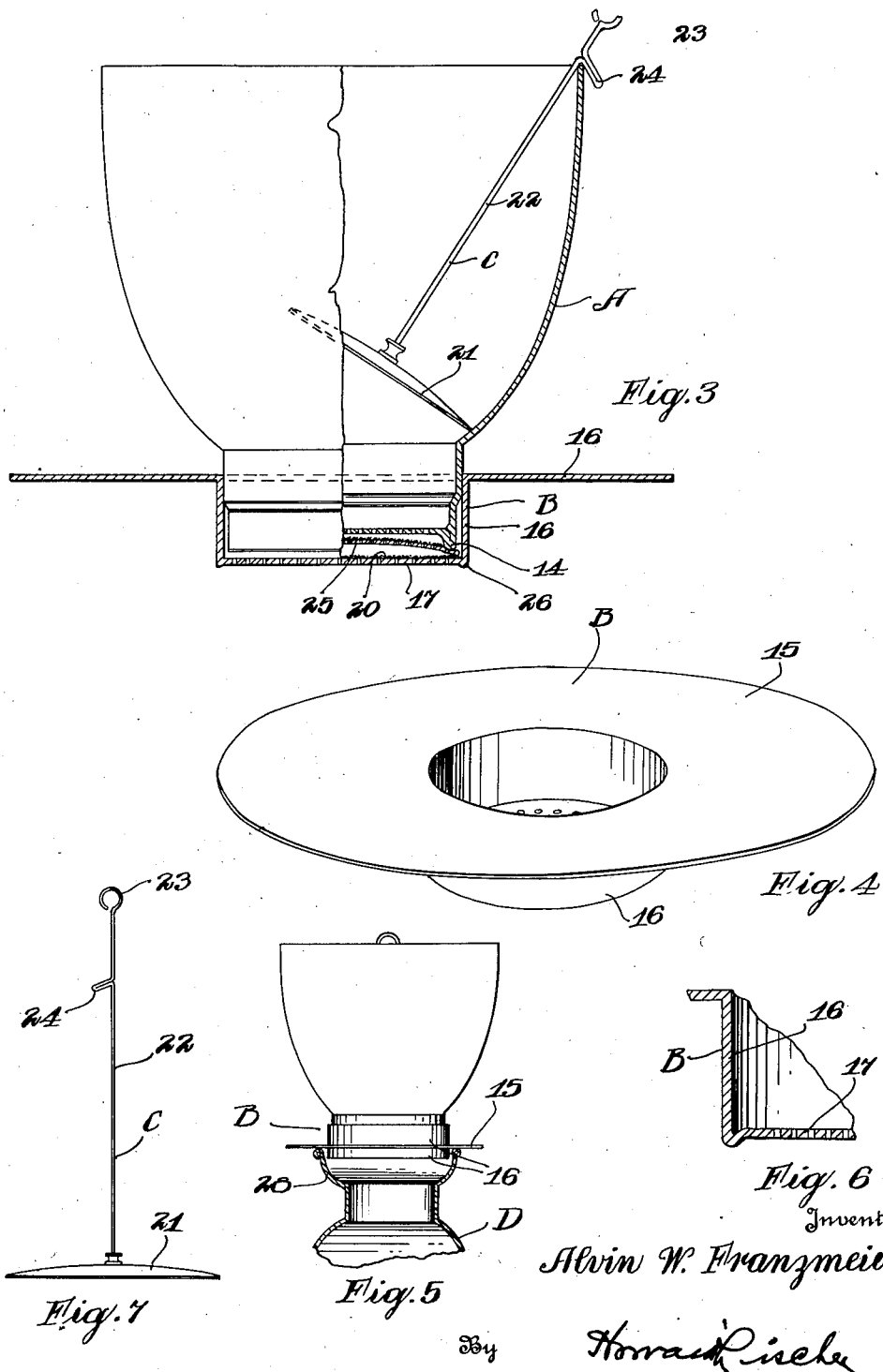

Nov. 10, 1936.  A. W. FRANZMEIER  2,060,392

MILK STRAINER

Filed June 6, 1931   4 Sheets-Sheet 3

Inventor
Alvin W. Franzmeier

By Howard Kricher
Attorney

Nov. 10, 1936.  A. W. FRANZMEIER  2,060,392
MILK STRAINER
Filed June 6, 1931   4 Sheets-Sheet 4

Inventor
Alvin W. Franzmeier
By  Howard Richey
Attorney

Patented Nov. 10, 1936

2,060,392

UNITED STATES PATENT OFFICE 2,060,392

MILK STRAINER

Alvin W. Franzmeier, Rich Valley, Minn.

Application June 6, 1931, Serial No. 542,530

6 Claims. (Cl. 210—158)

This invention relates to a milk strainer of a type adapted to be placed on top of milk cans or receptacles to strain the milk as it is poured into the receptacle.

Heretofore, there have been strainers constructed which are equipped to clamp a strainer cloth against a perforated member forming the bottom of the strainer. In these types of milk strainers, it has been found that when a certain amount of milk passes through the strainer cloth or strainer element, a coating or sediment forms thereon, causing the milk to strain through slowly, making a delay and the operator rather than wait for the milk to strain through or pour the milk in the strainer back and change the cloth, shakes the strainer which stirs up the milk and sediment so that some of the same is apt to pass through the cloth, or injures the straining cloth or element in such a manner that the milk will pass through more quickly, thus improperly straining the milk.

To overcome the faults of construction of the common types of strainers, as heretofore set forth, and to insure that all of the milk passing through the strainer is properly strained, I have devised a type of strainer which cannot be shaken without danger of spilling and losing some of the milk. This also overcomes the danger of the operator shaking the strainer and injuring the strainer cloth or element. In my strainer, there are two primary parts, one of which fits down into the other, while the strainer cloth fits between these two parts and is held in this position by the weight of the strainer, as well as by the weight of the milk within the strainer. This insures a sufficient close fitting of the parts so as to properly strain the milk through the strainer cloth or element, and also provides a means whereby shaking or separating of the two parts will cause milk to overflow or be wasted, unless a stopper means is used in the strainer funnel to shut off the flow of milk before the two parts are separated.

A feature of my strainer resides in means whereby the strainer cloth may be easily changed without the necessity of removing the milk from the funnel portion of the strainer, by means of a stopper which I provide which is easily placed in position to stop the flow of milk out of the bottom of the strainer. Then the two major parts may be easily separated and the straining cloth quickly changed if it is desired. This may be accomplished without the loss of milk and with the assurance that no unstrained milk will enter the can or receptacle if the operator will wait a moment after positioning the stopper in place, so as to permit the milk in the straining cup to at least partially drain out before separating the parts.

A further feature resides in a milk strainer wherein the straining disks, which may be made of cloth or other suitable material, are simply laid into the strainer cup member and then the strainer funnel proper placed on the top of the same so that the lower edge of the strainer funnel will act as a clamping mans to bite or engage into the marginal edge of the strainer cloth to hold the same firmly in place for straining the milk. My strainer does not require a clamping ring or element to hold the edge of the cloth in place. The strainer cloth is simply laid on the perforated bottom of the strainer cup which receives the lower end of the strainer funnel and then the funnel is clamped down on to the same by the weight of the funnel and the milk poured into the same.

It is an important feature of my invention to provide a milk strainer of a nature, as will be more fully hereinafter set forth, wherein the lower edge of one member acts to provide a gasket-like edge portion adapted to engage against a straining element, such as a cloth or other material, having a practical nature for providing a straining means for milk and the like, and with two major elements, namely, one the strainer funnel and the other the receiving strainer cup which is adapted to provide a means for holding the funnel on top of the milk can or receptacle into which the milk is to be strained. I thereby provide a very practical milk strainer which can be kept sanitary, wherein the operator will not try to shake the strainer if the straining process slows down because he knows he will be apt to spill some of the milk by reason of the nature of my strainer, and further because the operator knows that it is more easy to change the strainer cloth or element than to try to shake the strainer and because of the reason that the operator in using my strainer is assured that the milk will be more thoroughly and properly strained, than by old strainer means which has been used heretofore.

In my construction of strainer, it is also impossible to tear or break the cloth by stirring. The perforated bottom of the funnel portion of the strainer is above the cloth and thus, any article used to stir the milk will not come in contact with the strainer cloth.

My strainer may be devised to fit down into the neck of a milk can or container or a portion thereof may be made so as to be secured to the top of a milk can or container in a manner to hold the strainer funnel firmly in place.

It is an additional feature of my invention that my strainer may be equipped with an automatically operated stopper which will act to stop the flow of milk automatically as the funnel is raised from the receiving cup and which will allow the milk to flow virtually unrestricted when the funnel is set into the receiving cup. By use of this feature, the manually operated stopper may be eliminated.

These features, together with other details will be more fully and clearly set forth throughout the specification and claims.

In the drawings forming a part of this specification:

Figure 3 illustrates the milk strainer in a form where a double straining cloth or element may be used and with the stopper hung inoperative in the strainer.

Figure 4 is a perspective of the strainer cup and support.

Figure 5 illustrates another form of my strainer.

Figure 6 is a sectional detail of a portion of my strainer.

Figure 7 illustrates the stopper which may be used in my strainer.

Figure 1:
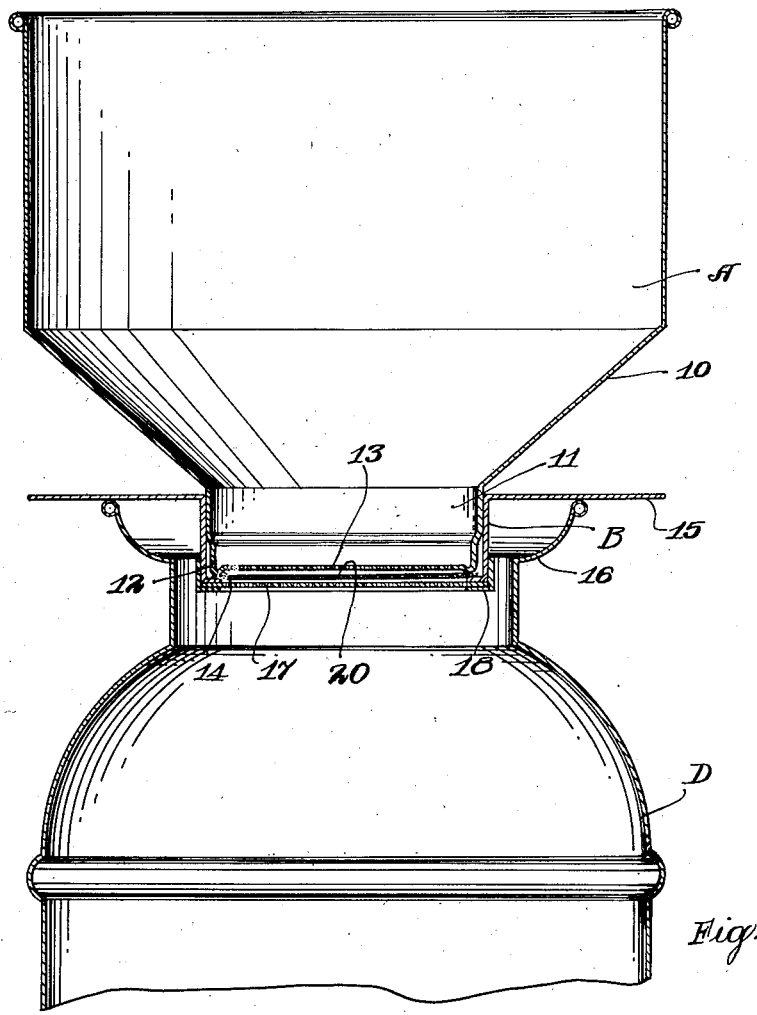
Figure 1 is a side sectional view of my milk strainer in operative position.

My milk strainer is formed by two major parts, such as the milk receiving funnel A and the strainer cup B into which the lower end of the funnel A is adapted to fit.

The strainer funnel A may be made of any suitable design and shape, and provided with a conical portion 10 which joins into the restricted cylindrical lower portion 11, and formed with a further restricted end 12 on the extreme lower end thereof. A perforated wall 13 is positioned in the lower portion of the member A spaced from the lower annular gripping edge 14 of the portion 12.

The strainer cup B is formed with a supporting horizontally disposed flange 15 from which the collar portion 16 is supported and which may depend from one or both sides of the flange 15. In the form of the strainer cup B illustrated in Figure 1, the collar 16 depends from one side thereof, while in the form illustrated in Figure 5, the collar extends through the flange 15 and projects from either side thereof. The purpose of this last structure will be later more fully pointed out.

Figure 2:
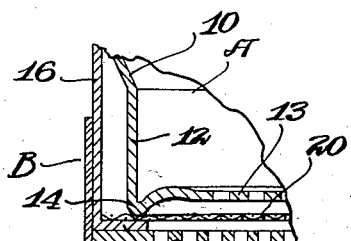
Figure 2 is a detail sectional view of a form of use of my strainer.

The strainer cup B as illustrated in Figure 1, is provided with a perforated bottom portion 17 which may be formed integral with the collar 16 or a separate disk portion held in place by the flange collar 18 as illustrated in Figures 1 and 2. Where the flange collar 18 is used and the perforated disk 17 is a separate part as just described, the flange collar 18 is adapted to hold the disk 17 against the horizontally disposed flange 19 formed on the lower end of the collar portion 16. In the construction of the strainer cup B illustrated in Figure 3, the collar portion 16 is formed with an integral perforated bottom portion 17 and in this construction it is not necessary to provide a supporting collar 18 for the perforated bottom 17.

My strainer is of a simple nature having the two major parts in the milk receiving funnel A and the strainer cup B and by placing a disk-like strainer cloth 20 on the perforated bottom 17 in the cup B and then placing the strainer funnel A with the gripping edge 14 engaging against the marginal edge of the strainer cloth or element 20, I have found that the weight of the member A, together with the weight of the milk which is poured into the same to be strained, is sufficient to cause the annular edge 14 to bite into the cloth 20 and hold it firmly in straining position. This provides a simple strainer wherein the cloth 20 may be quickly changed if it is desired. If the operator endeavors to tamper with my strainer so as to shake the strainer funnel A when the straining process slows down, he will be apt to lift the weight of the straining funnel A sufficiently off of the cloth 20 to cause milk to spill out over the top of the strainer cup B and thus, impair the straining operation. The operator in using my strainer knows this and will not do it because he further is advised of the easy manner in which the strainer cloth 20 may be changed so that when the cloth 20 becomes filled with sediment or clogged so as to slow up the straining process sufficiently to make it necessary to change the cloth 20, the operator can quickly do so in a simple manner.

To change the strainer cloth 20 without making it necessary to wait for the milk to drain out of the funnel member A, I provide a stopper C which is formed with a suitable stopper disk 21 made of rubber or other suitable flexible material and which is supported by the rod 22 having an eye engaging handle 23 on the upper end of the same, while the rod 22 is formed with a hook portion 24 so that the stopper C may be hooked over the side of the funnel A as illustrated in Figure 3 when it is not desired for use. This hook 24 holds the stopper C in readiness to be used when it is desired. When the stopper is to be used to close the lower end of the funnel A, it is only necessary to unhook it off of the edge of the funnel A and place the disk 21 over the openings in the wall 13 stopping the flow of milk out of the funnel A. The operator may then lift the funnel A out of the strainer cup B and the strainer cloth 20 may then be readily engaged and lifted off of the perforated bottom 17, whereupon a new clean strainer cloth can be placed upon the same and my strainer is then ready to be operated with full capacity as soon as the funnel A has been placed in operative position with the edge 14 firmly engaging against the marginal edge of the strainer cloth 20.

In Figure 3, I have shown a form of my strainer where two strainer cloths 20 may be used and in this construction, I place the lower strainer cloth 20 on the perforated bottom 17 and then lay a perforated convexed disk 25 which is formed with an annular gripping edge 26 which rests against the marginal edge of the lower strainer cloth 20, in position as illustrated. I then place a second strainer cloth 20 over the convex perforated disk 25 in position so that the gripping edge 14 of the funnel A may grip the upper strainer cloth 20 and the milk strainer is then ready to be operated with the strainer cloths 20 in operative position.

In the same manner more straining cloths may be applied within the cup B if it is desired. It is also evident that with this simple form of structure, my milk strainer may be kept very sanitary, there being only the two major parts A and B, while the strainer cloths such as 20 may be renewed at any time. It is also evident that these strainer cloths may be of any suitable material such as filtering paper or other means of filtering the sediment or dirt out of the milk as it passes through the same.

It is often found that the sediment in the milk gradually increases in proportion to the milk until the strainer cup B contains a large amount of this sediment which is too thick to pass through the strainer cloths. By stopping the flow of milk from the funnel A by means of the stopper C, this sediment in the cup B may be separated from the pure milk within the funnel A and the sediment thrown out and the strainer cloths replaced. In this manner, the thick sediment and the small amount of pure milk contained therewith, is thrown away to prevent any danger of the sediment entering the milk can over which the funnel A is positioned.

Where it is desired to obtain a large area for straining the milk, the collar 16 may be formed as illustrated in Figure 5 projecting from either side of the flange 15 or only from the upper side thereof, while the flange 15 holds the cup B in operative position upon the milk can D. In this construction the collar portion 16 of the strainer cup B is larger than that illustrated in Figure 1. In fact, it is made so large as to just fit within the outer flared end 28 of the can D.

Figure 8:
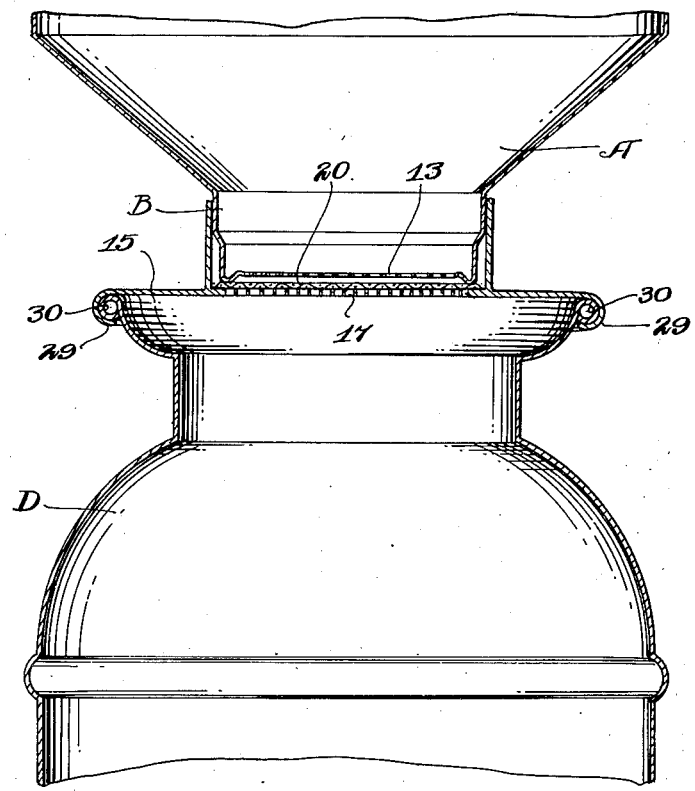
Figure 8 illustrates the use of another form of my strainer, which is adapted to be attached to the receptacle into which the milk is to be strained.
Figure 9:
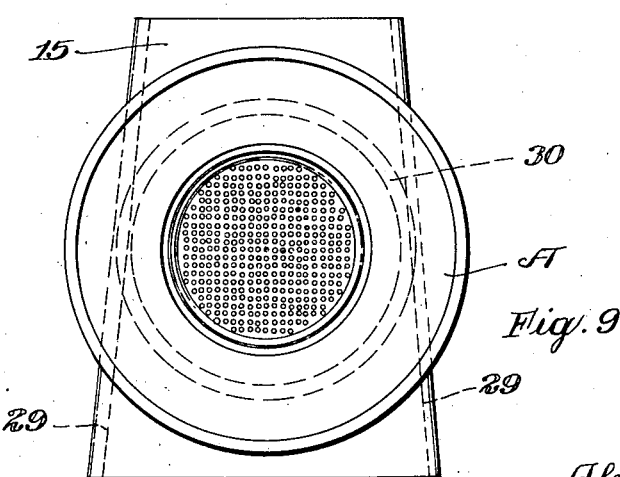
Figure 9 is a perspective view of one portion of the strainer cup and support used in the strainer illustrated in Figure 8 as it would appear when removed from the receptacle and separated from the upper portion of the strainer.

In the form of my milk strainer illustrated in Figures 8 and 9, I provide the flange 15 of the strainer cup B with an inturned channel portion 29 on either side of the same which is adapted to slip over and clamp the bead 40 formed on the top of the milk can D. The channel portions 29 may be made to converge toward each other slightly so that in this form the strainer cup B may be held adjustable to different size can tops and yet to provide a means of clamping the strainer cup B firmly in place on the top of the can D.

The strainer cloth or element 20 where only one cloth is used or where several strainer cloths or elements are used, are positioned between the perforated walls 13 and 17 and thus are protected therebetween. The operator cannot stir the milk in the funnel A and come in contact with the strainer elements 20. Thus, the operator cannot injure the strainer cloth 20 by stirring the milk with any instrument moved around in the funnel A. The fact that the strainer cloth lies freely between the two perforated walls 13 and 17 protects the same and also permits it to be easily removed when these walls are separated by separating the parts A and B. In operation these walls extend comparatively close, however, the engaging end 14 projects sufficiently from the wall 13 so as to form a gasket-like ring gripping edge which engages the marginal edge of the strainer cloth 20 to hold it firmly in place. While the weight of the funnel A is virtually sufficient to hold the cloth 20 in place, it is also obvious that the weight of the milk poured into the funnel A will assist in causing the edge 14 to grip the marginal edge of the cloth 20 more firmly. The bottom 17 may be formed by a series of bars extending across to make open slots through which the milk may drain.

Heretofore, in milk strainers the operator was very much inclined to shake the strainer when the straining process slowed down and in doing this the operator usually stirred up the sediment in such a manner to force part of it through the strainer cloth or tore the cloth and the milk passed through, the operator not realizing that the milk was not properly strained.

It is my desire to provide a milk strainer to overcome these disadvantages and to prevent the operator from tearing the strainer cloth and also to warn him not to shake the strainer at any time because he will spill the milk out of the cup B. It is not possible for the operator to shake the funnel A in a manner to tear the cloth in my strainer. If the operator disturbs the funnel A while in operating position without placing the stopper C in position to close the bottom 13, the milk will spill out of the cup B. The operator further knows that with my strainer, he can quickly change the strainer cloth 20, it being only necessary to place the stopper C in position to close the funnel A and raise the funnel, then removing the cloth 20 by just lifting it out after which the operator may put a new cloth 20 in operative position and place the funnel back in position to strain the milk. With this simple operation, I believe that my milk strainer forms a more practical and desirable means of straining milk than has been accomplished heretofore and with only the two major parts A and B which can be easily kept sanitary at all times.

My funnel A may also be equipped with an automatically operating stopper E which acts to allow milk to pass into the strainer cup B when the funnel A is in position within the same and which will close off the flow of milk when the funnel A is removed therefrom. This stopper E in preferred form is provided with a stiff body sheet 32 of metal or other stiff material and the lower surface of the body sheet 32 is provided with a circular gasket 33 of rubber or other suitable material. This rubber gasket 33 may be formed integrally with the body sheet 32 or may be connected thereto removably for the purpose of cleaning. The gasket 33 is adapted to fit against the outer periphery of the upper surface of the perforated wall 13. When milk is contained in the funnel A, the weight of the milk together with the weight of the stopper E causes the stopper to naturally bear against the perforated wall 13 preventing milk from passing through this perforated wall. The lower surface of the body sheet 32 is provided with a series of pins 34 or lugs which pass through the perforations in the wall 13 and which bear against the perforated bottom portion 17 of the strainer cup B. These pins 34 are sufficiently long that when the funnel A is placed into the strainer cup B the pins 34 will raise the stopper E away from the perforated wall 13 and allow milk within the strainer to pass through this wall 13 freely.

Figure 10:
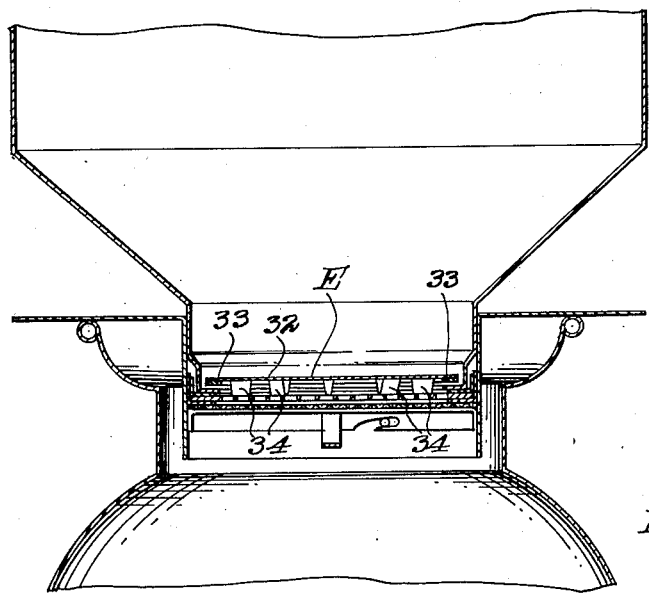
Figure 10 is a sectional view illustrating my automatically operated stopper in raised position to permit milk to flow through the strainer element.
Figure 11:
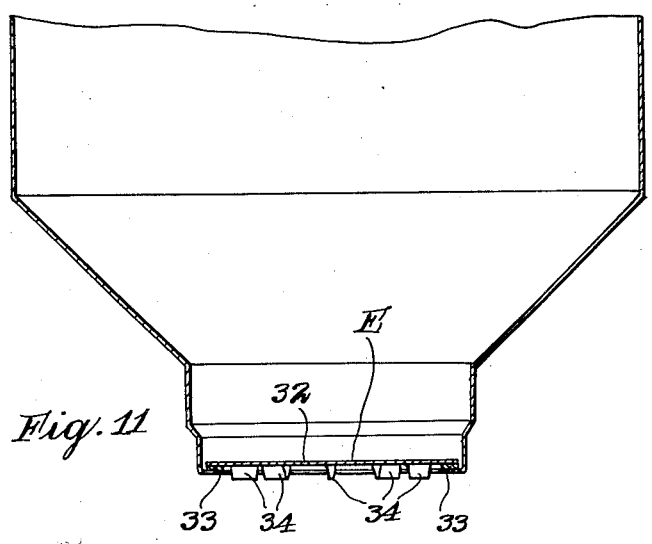
Figure 11 is a sectional view of my strainer funnel with the automatically operated stopper in closed position, the funnel being raised from the receiving cup.

When the strainer is equipped with a stopper of the type illustrated in Figures 10 and 11 when the funnel A is raised from the strainer cup B the weight of the stopper E and the milk contained within the funnel A will immediately force downwardly the stopper E, the gasket forming a tight seal to prevent milk from leaving the funnel A. As soon as the funnel A is replaced into the strainer cup B the flow of milk from the funnel will immediately start.

The stopper E may be made in many different ways, such as being constructed entirely of rubber or of having the entire lower surface thereof covered with rubber to form a seal over the entire surface of the perforated wall 13. Each type of construction of stopper E would act, however, in the manner above described.

In accordance with the patent statutes, I have illustrated and described a particular form of my milk strainer, however, I desired to have it understood that these illustrations are only suggestive and that the invention may be carried out by other means and applied to other uses than those above set forth within the scope of the following claims without departing from the purpose and intent hereof.

I claim:

1. A milk strainer including, a funnel member, a perforated bottom on said funnel, a stopper above said bottom, and means on said stopper extending through said perforated bottom to hold the stopper away from said perforated bottom when the funnel is resting upon a support.

2. A milk strainer including, a funnel member, a receiving cup into which said funnel is adapted to fit, a perforated bottom thereupon, a funnel outlet, stopper means, and means on said stopper means extendable through said outlet to engage said perforated bottom to support the same out of operable position when said funnel is positioned on said receiving cup.

3. A milk strainer including, a receiving cup including, a top portion, a recessed portion including side walls and a perforated bottom portion, and a strainer adapted to fit into said receiving cup comprising, an upper tapering portion, a side wall portion adjacent said tapering portion adapted to fit snugly against a portion of said side walls of the receiving cup, a lower portion of smaller diameter forming a part of the side walls of the strainer, and a perforated bottom on said strainer.

4. A milk strainer including a receiving cup comprising, a receptacle top engaging portion, a recessed portion having side walls and a perforated bottom, and a funnel portion adapted to fit within said receiving cup comprising, an inwardly tapering upper portion, a side wall portion adapted to fit closely against a part of the side walls of the receiving cup, a lower offset portion of the side walls of smaller dimensions than said side wall portion, and a perforated bottom spaced upwardly from the lower extremity of said offset portion.

5. A milk strainer including, a funnel member, a receiving cup into which said funnel is adapted to fit, a perforated bottom in said funnel, a stopper in said funnel member movable into operable position when said funnel member and said cup are separated, lugs on said stopper and means on said cup engageable with said lugs for spacing said stopper out of operable position when said funnel and said cup are together.

6. A milk strainer including a funnel member, a perforated bottom thereon, a member for supporting said funnel member, an outlet in said funnel through said perforated bottom, a stopper in said outlet, and a plurality of means extending through said perforated bottom on said stopper and means on said supporting member engageable with said means for supporting the stopper out of operative position when said funnel is positioned on said supporting member.

ALVIN W. FRANZMEIER.